Jan. 15, 1963

A. W. FISCHER 3,073,215

OPTICAL RECORDING SYSTEM

Filed July 6, 1959

2 Sheets-Sheet 1

INVENTOR.
ALBERT W. FISCHER

BY Christie, Parker & Hale
ATTORNEYS

Jan. 15, 1963 A. W. FISCHER 3,073,215

OPTICAL RECORDING SYSTEM

Filed July 6, 1959 2 Sheets-Sheet 2

INVENTOR.
ALBERT W. FISCHER
BY Christie, Parker & Hale
ATTORNEYS 3,073,215

OPTICAL RECORDING SYSTEM

Albert W. Fischer, Pasadena, Calif., assignor, by mesne assignments, to Consolidated Electrodynamics Corporation, Pasadena, Calif., a corporation of California Filed July 6, 1959, Ser. No. 825,120
2 Claims. (Cl. 88—24)

Figure 1:
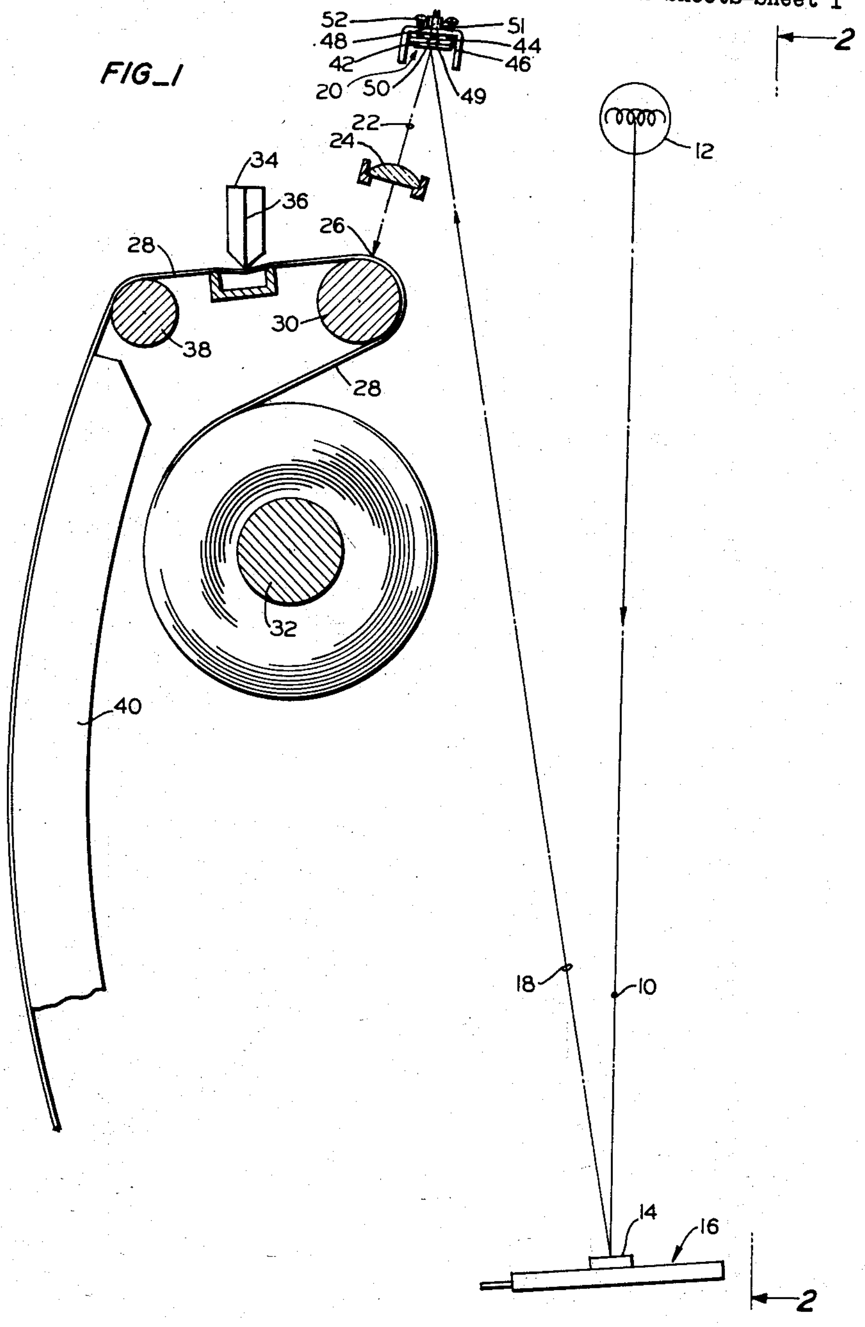

This invention provides apparatus for correcting a beam of light reflected by a rotatable mirror, such as is used in a suspension type galvanometer.

A typical suspension galvanometer measures a small signal or electric current by the deflection the current produces in flowing through a coil or wire suspended in a magnetic field. A mirror is attached to move with the coil and reflect a beam of light directed on the mirror from a light source. The direction of the light beam striking the mirror is the optical center line of the system. Conveniently, the position of the reflected light beam is recorded by focusing it to a spot on photographic paper disposed around a roller with its axis of rotation perpendicular to the light beam striking the mirror. Thus, as the mirror is rotated about an axis perpendicular to the roller, the light beam spot is deflected longitudinally along a straight line on the surface of the roller or paper.

One disadvantage of this conventional arrangement is non-linearity of light beam deflection along the recording paper for larger signals. As the mirror is rotated from the optical center line of the system, a given increment of rotation results in ever increasing incremental displacement of the light spot along the recording paper. Thus, a given signal change at or near full scale deflection produces a larger movement of the reflected light spot along the recording paper than when the reflected beam is near zero deflection. The result is a non-linear record, with the larger signals appearing out of proportion with the rest of the record.

Another disadvantage of the prior art system is that as the mirror is rotated from the optical center line, the reflected light beam travels an ever increasing distance, which impairs the intensity of the spot produced by the light on striking the recording medium. For sharpness of record and minimum power requirements for the light source, the spot of light should be kept as intense as possible.

This invention provides apparatus for reducing one or both of the two aforementioned disadvantages.

For example, it is often desirable to be able to deflect the spot of light through a total distance of 10 inches or so. However, with conventional recording galvanometers, in recording amplitudes in excess of about eight inches for an optical arm 26 inches long, the linearity error becomes excessive, and the spot goes out of focus. With this invention, it is possible to record amplitudes up to 11 inches with a linearity error of about 0.1%., and with negligible impairment to the focus of the light spot.

Briefly, the invention contemplates apparatus for correcting a beam of light reflected by a mirror from a source of light. The apparatus includes elongated means, such as a roller, for forming a straight image surface which the reflected light beam strikes. An elongated optical element is spaced from and extends in the same general direction as the straight image surface to be in the path of the reflected beam. A first part of the optical element is nearer the image surface than a second part longitudinally spaced from the first part to correct the reflected beam as it moves along the optical element.

When the reflected light beam is to be corrected for non-linearity, the optical element is a preferably correcting mirror set to reflect the light beam from the galvanometer mirror onto the image surface. Preferably, the central portion of the correcting mirror is substantially perpendicular to the optical axis and is farther from the image surface than the ends of the mirror so that the light beam reflected by an end portion of the mirror is corrected to compensate for its divergence from linearity due to its deflection from the optical axis.

When the reflected light is to be corrected for impairment of spot intensity due to deflection away from the optical axis, the optical element is an elongated lens through which the light beam passes prior to striking the image surface. Preferably, the central portion of the lens is substantially perpendicular to the optical axis, and is farther from the image surface than the ends so the distance traveled by light from the lens to the image surface is always approximately equal to the focal length of the lens.

Figure 2:
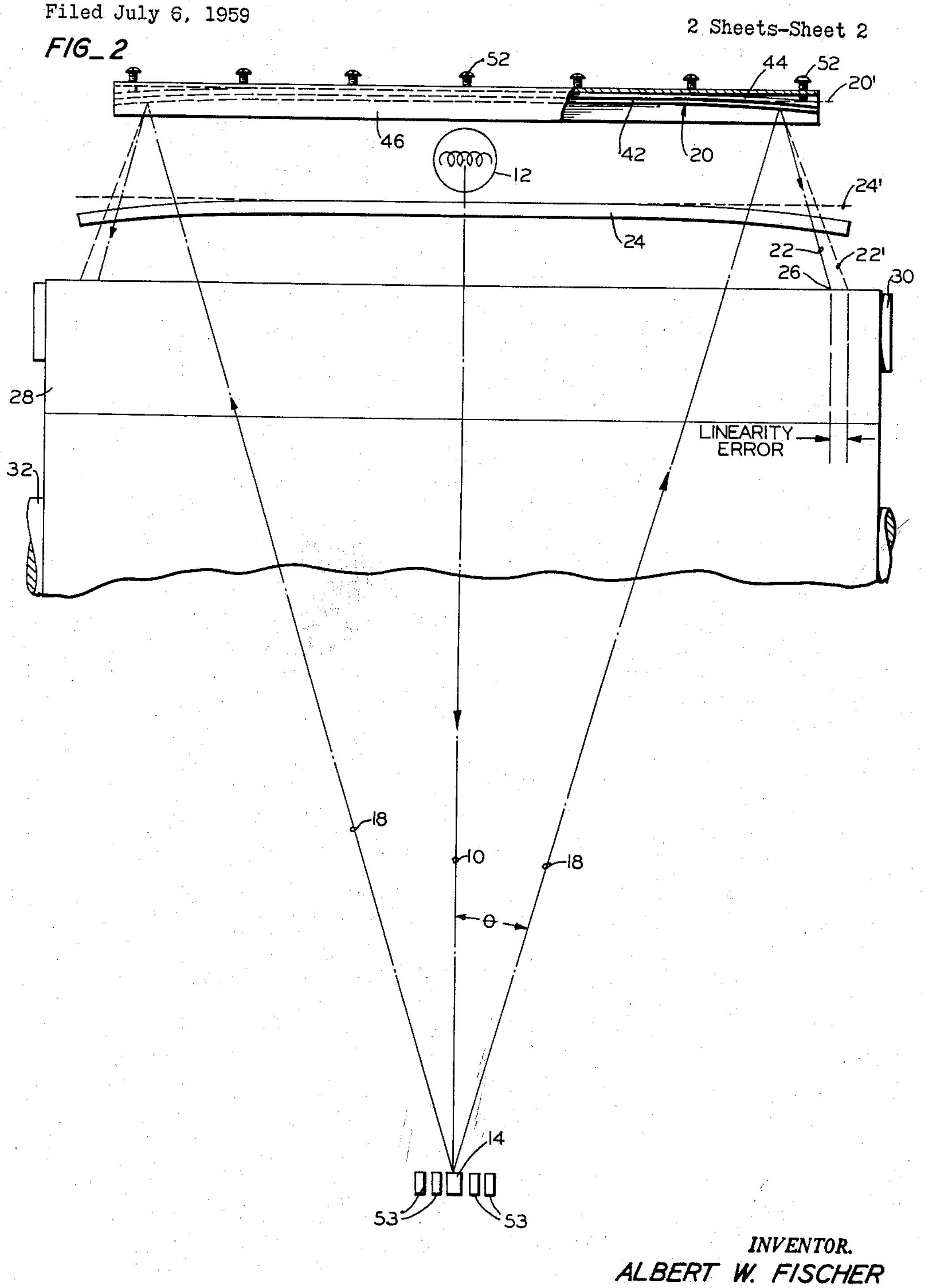

These and other aspects of the invention will be more fully understood from the following detailed description taken in conjunction with the accompanying drawings in which:

FIG. 1 is a schematic side elevation of the presently preferred embodiment of the invention; and FIG. 2 is a view taken on line 2—2 of FIG. 1.

Referring to the drawing, a beam of light 10 from a lamp 12 is focused by conventional means (not shown) on a mirror 14 in a galvanometer 16, which may be of a conventional suspension type. The beam of light 10 defines the optical axis or center line of the system. A beam of light 18 reflected from the galvanometer mirror 14 strikes an elongated correcting mirror 20, and is reflected along a beam 22 through an elongated cylindrical lens 24, which focuses the light in a spot 26 on a strip of photographic recording paper 28 disposed around a recording roller 30 having its axis of rotation substantially parallel to the elongated lens and correcting mirror, and perpendicular to the optical axis of the system. The photographic paper comes from a supply roller 32, and after passing over the recording roller where it is exposed to the spot of light 26, passes through an applicator 34 having a slit 36 through which a processing solution (not shown) is applied to develop the image of the spot. Thereafter, the paper 28 passes over a guide roller 38 and a hot platen 40 where the paper and processing solution are heated and the photographic paper developed. Alternatively, the light can be ultraviolet and the recording medium direct print paper, which needs no developing solution.

The correcting mirror 20 includes a strip of reflecting glass 42 bonded to a strip of metal 44. Preferably, the metal is 410 stainless steel with coefficient of thermal expansion closely matching that of the reflecting glass. The glass is bonded to the stainless steel strip with any suitable adhesive, say an epoxy resin. The dimensions of the correcting mirror can be any desired, but for a length of about one foot, I found it satisfactory to use a stainless steel strip about .080″ thick, and glass about 1/16″ thick. These dimensions give the correcting mirror sufficient lateral flexibility for the purpose described below.

The correcting mirror is secured in an elongated U shaped frame 46 opening toward the lens 24. A plurality of longitudinally spaced holding screws 48 with their heads 49 disposed in countersunk bores 50 in the steel strip 44 extend through internally threaded bosses 51 on the outside of the frame 46. A pair of adjusting screws 52 are disposed on opposite sides of each holding screw 48, and are threaded through the frame to bear against the back side of the steel strip 44. Thus, by turning the holding screws to advance them toward the recording roller, and also advancing the adjusting screws 52 toward the roller to maintain the mirror in a tightly locked position, the ends of the mirror can be deflected or curved from the normal dotted line position shown at 20′ in FIG. 2 so that the ends of the correcting mirror are nearer the recording roller than the central position of the correcting mirror, which is substantially perpendicular to the optical axis of the system.

As shown in FIG. 2, the ends of the lens 24 are bent so as to be nearer the recording roller than the central portion of the lens, which is perpendicular to the optical axis of the system.

The galvanometer mirror 14 lies on the optical axis of the system, and is adapted to rotate about an axis perpendicular to the axis of the rotation for the recording roller. The beam of light 10 is deflected through an angle $\theta$ from the optical axis by an amount which depends on the strength of the signal applied to the galvanometer coil (not shown). As the angle $\theta$ through which the galvanometer mirror is turned increases so that the reflected beam of light 18 strikes a bent portion of the correcting mirror as shown in FIG. 2, the light is reflected from the correcting mirror along beam 22 instead of along dotted path 22′, which is the path the light beam would follow if the correcting mirror were straight instead of curved. The linearity error is indicated by the arrows in FIG. 2.

The beam of light reflected from the galvanometer mirror lies in a plane perpendicular to that of FIG. 2, and in passing through the lens is focused on the spot at point 26 on the recording paper. Since the light traverses a greater distance between the lens and the recording paper when angle $\theta$ is large than when angle $\theta$ is small, the location of the outer end of the lens nearer the roller keeps the distance traveled by the light from the lens to the recording paper substantially the same as the focal length of the lens, even when $\theta$ is large.

The degree of bending of the mirror depends on the length of the optical arm of the system, which is the sum of the distance traversed by beams 18 and 22, and the maximum angle $\theta$ through which the galvanometer mirror is to be turned. By way of example, in a system with a 26″ optical arm, linearity error is about .1% for a deflection of the light spot over a total distance of about 11″ with the apparatus of this invention. Prior to the invention, in recording amplitudes in excess of about eight inches double amplitude, the linearity error was excessive, and the spot went out of focus. By simply bending the lens only $\frac{1}{32}$ of an inch from the dotted line position 24′ at its ends, I was able to maintain an intense spot with unimpaired focus at deflections up to 11″ double amplitude.

The lens can be bent to the shape shown in FIG. 2 by any suitable means, but conveniently, it is heated to about 1,000° F., deflected to the desired shape, and cooled while maintaining the desired shape.

As shown in FIG. 2, the galvanometer mirror 14 is located on the optical axis of the system. The invention is also applicable to recording systems with a mirror, or mirrors, located slightly off the optical center line. For example, as shown schematically in FIG. 2, the system will correct for non-linearity and impairment of focus for as many as two additional galvanometers 53 located on each side of the central galvanometer mirror 14. Some accuracy is sacrificed in using more than one galvanometer, but the result is still a substantial improvement over that obtained with the uncompensated system of the prior art.

The correcting mirror also makes it possible to correct a second source of error in a galvanometer which is due to the coil deflecting from a strong field at the center or zero position to a weaker field at maximum deflection. Both this second error and the linearity error due to the geometry of the system are simultaneously corrected in accordance with this invention with the correcting mirror.

I claim:

1. A recording system comprising a light beam source, means for oscillating the light beam about an axis in accordance with a signal to be recorded, a strip of photographic recording paper disposed to form a straight image surface in the path of the light beam and extending perpendicular to the said axis, and an elongated stationary light-converging lens spaced from and extending in the same general direction as the image surface, the lens having converging power throughout its length and being disposed in the path of the light beam, the lens having a central part farther from the image surface than its ends to form a spot of light of substantially constant intensity on the image surface as the beam is oscillated.

2. A recording system comprising a light beam source, means for oscillating the light beam about an axis in accordance with a signal to be recorded, a strip of photographic recording paper disposed to form a straight image surface extending perpendicular to the said axis, an elongated mirror spaced from and extending in the same general direction as the image surface and being disposed to reflect light from the source onto the image surface, the ends of the mirror being disposed to be nearer the image surface than the central portion of the mirror, and an elongated stationary light-converging lens disposed in the path of the light beam between the mirror and the image surface and extending in the same general direction as the image surface, the lens having converging power throughout its length, and having a central part farther from the image surface than its ends to form a spot of light of substantially constant intensity on the image surface as the beam is oscillated.

References Cited in the file of this patent

UNITED STATES PATENTS

| | | |
|---|---|---|
| 1,811,770 | Wheeler | June 23, 1931 |
| 2,478,698 | Kellogg | Aug. 9, 1949 |
| 2,576,011 | Grey | Nov. 20, 1951 |
| 2,647,434 | Zobel et al. | Aug. 4, 1953 |
| 2,692,369 | Geiser | Oct. 14, 1954 |
| 2,782,679 | Brueder | Feb. 26, 1957 |
| 2,864,277 | Eichorn | Dec. 16, 1958 |

FOREIGN PATENTS

| | | |
|---|---|---|
| 664,364 | Germany | Aug. 25, 1938 |
| 1,008,598 | France | Feb. 27, 1952 |